Figure 1:
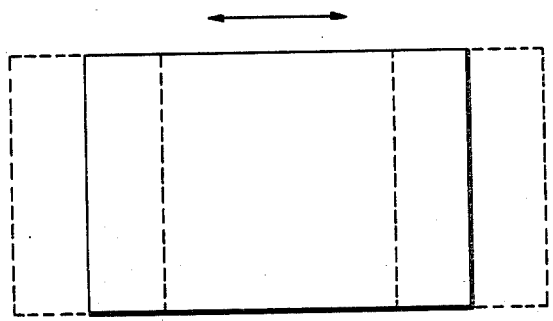

Feb. 14, 1961     L. GRUNIN ET AL     2,971,223
PROCESS OF PREPARING CAST SYNTHETIC RESIN HAVING INTEGRAL SHEEN
Filed Jan. 16, 1959     2 Sheets-Sheet 1

Feb. 14, 1961   L. GRUNIN ET AL   2,971,223
PROCESS OF PREPARING CAST SYNTHETIC RESIN HAVING INTEGRAL SHEEN
Filed Jan. 16, 1959   2 Sheets-Sheet 2

United States Patent Office 2,971,223
Patented Feb. 14, 1961

2,971,223

PROCESS OF PREPARING CAST SYNTHETIC RESIN HAVING INTEGRAL SHEEN

Louis Grunin, 1 Trinity Ave., Spring Valley, N.Y., and Seymour Richman, Jeffrey Place, Monsey, N.Y.

Filed Jan. 16, 1959, Ser. No. 787,193

5 Claims. (Cl. 18—58)

This invention relates to the preparation of cast synthetic resin and, more particularly, to the preparation of such resin in the form of sheets and bodies of other shapes having integral sheen.

The term "integral sheen" is used herein as a generic term to cover the several recognized varieties of sheen forming an integral feature of the body and substance of a material, as opposed to effects dependent upon the character or treatment of its surface, this integral sheen being due in its effect to a more or less ordered and systematic orientation within the material of lamellae (flat plates, crystals, and the like) of substances capable of reflecting light. As regards appearance, the term thus includes the various types of sheen and character of sheen commonly designated, in the plastics industry, by the terms pearly, nacreous, silky, metallic, chatoyant and pearlescent.

Various substances, characterized in common by their occurrence in the form of light-reflecting lamellae, have been widely used for the purpose of imparting integral sheen to various transparent or substantially transparent plastics, such as cellulose esters and resin plastics. Such substances, including the so-called pearl essence obtained from fish scales, various inorganic and organic substitutes therefor, and metal bronzing powders, are well known in the art, as are also various methods whereby these lamellae may be brought into systematic orientation so as to yield certain desired visual effects. It is well recognized that to obtain a sheen effect light-reflecting lamellae must be positioned or oriented so that a large percentage of them lie with their broad faces parallel to each other and substantially parallel to the surface of the plastic which is to have the appearance of sheen.

Additionally, various cumbersome techniques of imparting integral sheen have been attempted such as inserting solid objects into the liquid polymer mix and either moving the objects, e.g. by magnets or by working the mold from side to side so the turbulent liquid moves against the solid objects or agitator.

This invention provides an improved method of obtaining the integral sheen. The method comprises introducing a liquid organic compound adapted to give a polymer solid at ordinary temperatures into a mold, subjecting the mold containing the liquid organic compound to any type of reciprocating motion, whereby pigment crystals are so oriented as to impart the integral sheen, while the mold is subjected to polymerization conditions to induce polymerization of the organic compound to a polymer solid: The polymer solid is then withdrawn from the mold.

The molds employed are known in the art, e.g. cells usually being composed of two glass plates separated by a compressible gasket. It is particularly preferred that at least one of the surfaces of the mold be rippled, i.e. patterned as distinguished from smooth surfaced. The inside surfaces of the glass mold offer a shearing type of resistance to flow of the liquid as the mold is subjected to a reciprocating motion. This shearing force on the liquid is greatest at the interface of the liquid and the mold surface, and this force decreases as the distance from this interface increases. The smallest shearing force is exerted on the liquid which is at the geometric center between the two plates of the mold. The particular lamellae used to produce the integral sheen are subject to the shearing force of the liquid so that they orient into a position of least resistance to this shearing action. This oriented direction is such that the lamellae lie flat and parallel to the inner surfaces of the glass mold. Because of the reduced shearing force on the liquid at the center of the liquid, the lamellae are not as strongly oriented, the result being that a parabolic line or curve of orientation is formed. The crystals line up along this curve so that their plate-like faces are parallel to the curve. At the peak of the parabola the crystals are in random unoriented positions. Thus the sheets on examination from the side give a characteristic horizontally directed line down the center substantially parallel to the long surface. The integral sheen imparted is permanent and thus remains even after a patterned sheet has been machined smooth.

The term liquid organic compound adapted to give a polymer solid at ordinary temperatures connotes either thermoplastic materials or thermosetting mix materials which are liquid under ordinary treating conditions. For removal of solid thermoplastic product materials, the mold is first cooled down. These materials and their technology are known. Examples of thermoplastic resins employed are called polymers or co-polymers of materials containing an ethylenic group $CH_2=C<$. Examples of monomers used to make these polymer materials are as follows: Styrene and styrenes with alkyl and halogen substituents on the ring and side chain such as o, m, and p-methyl styrene, alpha methyl styrene, 2,4 dimethyl styrene, 2,3 dimethyl styrene, 2,5 dimethyl styrene, alpha chlorostyrene, bromostyrene, dichlorostyrene, etc.; esters of alpha methylene aliphatic monocarboxylic acids such as methyl acrylate, ethyl acrylate, dodecyl acrylate, 2 chloroethyl acrylate, phenyl acrylate, methyl methacrylate, ethyl methacrylate, acrylonitrile, methacrylonitrile; vinyl esters such as vinyl acetate, vinyl butyrate, etc., vinyl ethers such as vinyl methyl ether, vinyl 2-chlorethyl ether; vinyl ketones such as vinyl methyl ketone, methyl isopropenyl ketone; isobutylene; vinylidene halides such as vinylidene chloride; N-vinyl compounds such as N-vinyl pyrrol, N-vinyl carbazol; acrolein acrylamide, methacrylamide; allyl compounds such as allyl alcohol, allyl lactate and copolymers of any of these materials.

These materials may be handled either in their polymeric form or as monomers as shown in the accompanying examples.

Types of thermosetting materials to be used are much more complex in nature. In general, it may be stated that any material or mixtures of materials that gives a polymerization functionality greater than 2 will yield a thermosetting product. Some examples of these materials are: polyester resins, a name familiar to those skilled in the art and referring to a material comprising a cross-linking vinyl monomer of the type shown above and an unsaturated polyester or alkyd formed by condensing and esterifying a polyhydric alcohol and a polycarboxylic acid.

Epoxy resins, a material containing oxirane oxygen linkages and employing various cross-linking hardeners containing an active hydrogen atom, such as organic acids, anhydrides or amine type compounds can be used. Various materials containing two or more ethylenic linkages such as divinyl benzene, diallyl phthalate diallyl malonate, allyl methacrylate, diallyl carbonate, triallyl cyanurate, tetrallyl silane, or copolymers of these materias and mono ethylenic materials as listed earlier may be used in this process.

The term reciprocating motion as used herein, connotes motion from side to side, up and down, or partial rotation such as oscillation. This reciprocating motion may be imparted to the mold in either a horizontal or vertical plane or any position in between. The motion is preferably confined to a substantially fixed plane so as not to impart a random turbulence.

Figure 2:
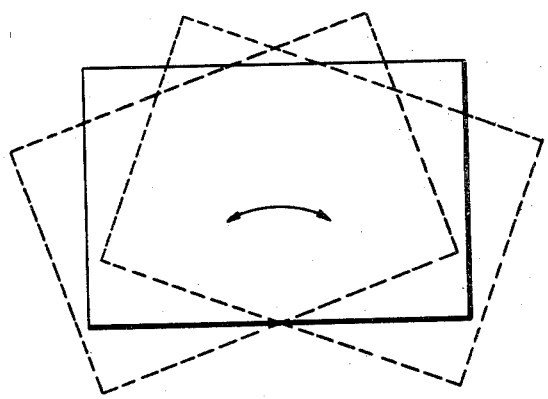
Figure 3:
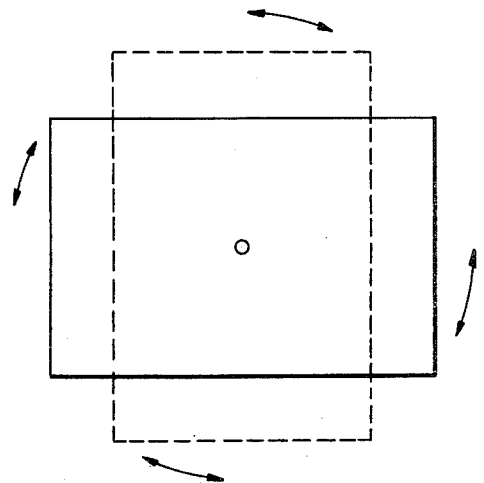

Figures 1–3 respectively show side elevation of the mold being moved from side to side, rocked on a pivot through a 20 degree angle, and oscillated about a center point.

The actual control of the reciprocating motion depends on the frequency of movement and the distance travelled through or from any given point, e.g. a 3 foot by 4 foot mold is oscillated thru a 20 degree angle at a rate of 1 to 80 cycles per minute, depending on effect desired, or a two foot by two foot mold is vibrated up and down thru a distance of 1/16 of an inch at a frequency of 60 cycles per second. The control is thus determined empirically and can be above 100 cycles per minute.

The invention and its advantages will be better understood by reference to the following examples.

Example 1

Figure 5:
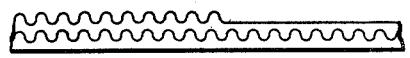

To one hundred parts of a general purpose styrene based polyester resin at a viscosity of 1000 cps. is added 2 parts of nacreous pearl essence pigment, 1 part methyl ethyl ketone peroxide and .003 part cobalt metal introduced as cobalt naphthenate. This mixture is poured into a mold made of two glass plates one foot by one foot by one quarter inch thick. One of these glass plates has a ribbed type pattern with the pattern surface internal to the mold. The glass plates are separated around the periphery with a round rubber gasket 1/8 inch in diameter and held together with suitable clamps to maintain a resin tight seal between the plates. This mold is placed in a frame work attached to a reciprocating drive in a vertical position and moved side to side through a distance of 1/2 a foot at 100 cycles per minute. The mold is held at room temperature for a period of two hours then the motion is stopped and the mold is heated by hot air in an oven to a temperature of 180 degrees F. for a period of one hour. The mold is removed from the frame and opened yielding a hard plastic sheet having an integral sheen and a line running approximately down the geometric center when examined from the side, as shown in Figure 5.

Example 2

To 100 parts of inhibitor free methyl methacrylate are added .005 part acetyl peroxide. This mixture is heated at 85 to 90 degrees C. until a syrup with a viscosity of S–W on the Gardner-Holdt viscometer scale at room temperature is obtained. To 100 parts of this syrup are added one part of a synthetic nacreous pearl pigment and one part acetyl peroxide. This mixture is placed in a mold made of one flat piece of glass and one plate of glass containing a surface pattern of a cross ribbed nature. These types of patterned glass are well known to those in the glass plate field. The pattern is faced toward the plain glass plate and the two plates are separated by a vinyl gasket 0.225 inch square and suitably clamped to maintain a proper seal between the plates. This mold is placed in a suitable frame in a horizontal position and rocked through a 25 degree arc in a reciprocating manner at 20 cycles per minute in a hot air oven at a temperature of 125 degrees F. After 8 hours the temperature is raised to 160 degrees F. and heated for another 8 hours. At this time the mold is slowly cooled to room temperature and opened, yielding a hard sheet having integral sheen, and a pattern on one side that is the exact impression of the patterned glass plate used in the mold. This pattern has propagated itself into the sheet in such a manner that the pattern is also visible in the integral sheen on the flat side of the sheet. If the pattern is machined off the sheet yielding a flat sheet, the pattern can still be seen in the sheet as part of the integral sheen.

Example 3

100 parts of clear polystyrene molding compound is heated to 450 degrees F. 2 parts of a natural pearl essence pigment are intimately mixed with the melted liquid polymer. This mixture is then poured into a hot 2 foot by 2 foot glass plate mold made up of two heat treated glass plates, one plate having a hammered pattern finish and the plates are sealed with a Teflon gasket 1/4 of an inch thick and clamped together. The mold is placed in a vertical holding frame which is directly connected to a Syntron type of vibrating unit. The mold is suspended in a hot oil bath at 450 degrees F. and vibrated at 60 cycles per second for 1/2 an hour. At this time, the mold is removed from the oil bath and vibrated at room temperature until it has cooled down to give a fairly hard polymer material i.e. about 200 degrees F. The vibration is then stopped and the mold allowed to cool down to room temperature at which time it is opened and the hard polymeric sheet removed. The sheet of plastic has an exact impression of the pattern contained on the glass. It has a lustrous surface of an integral sheen patterned effect induced in the sheet by the pattern surface of the glass used in the mold.

Example 4

To 100 parts of a low viscosity (5000 cps.) diglycidyl ether of bisphenol–A epoxy resin are added ten parts of diethylene triamine and two parts of a synthetic nacreous pearl pigment. This mixture is poured into a mold and treated in a manner like Example 1 at a temperature of 60° C. for two hours of reciprocating motion, and then post cured at 100 degrees C. for three hours. The sheet is cooled down to room temperature and opened yielding a material having a lustrous integral sheen.

Example 5

To 100 parts of methyl styrene (a mixture of o, m, and p) is added 0.05 percent benzoyl peroxide. This mixture is heated at 100° C. until a syrup of P–Q viscosity on the Gardner-Holdt viscometer scale at room temperature is obtained. To one hundred parts of this syrup is added one and a half parts of a pearl essence pigment and one part of benzoyl peroxide. This mixture is placed in a mold similar to the one used in Example 1, and moved through a reciprocating motion as described in Example 1. The mold is heated in an oven at 180 degrees F. for 6 hours, while being moved. Then the mold is placed in an oven at 250 degrees F. for 8 hours at which time the mold is cooled to room temperature and the sheet removed. The sheet has a pattern on the surface duplicating the glass mold that was used and an integral sheen pattern that propagates into the sheet. This pattern is in evidence even if the sheet is machined smooth on the surface.

Figure 4:
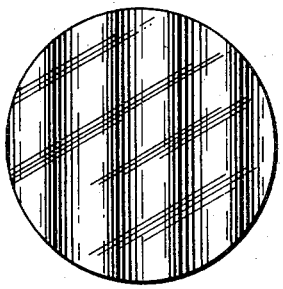

The products of this invention are further exemplified in Figures 4 and 5. Figure 4 is a top view of a patterned object cut from a sheet prepared according to the examples. Figure 5 is a sectional view of a patterned sheet, a portion of whose surface has been machined smooth. The type of line seen from the edge of such a patterned sheet, and characteristic of this invention, is shown.

Depending upon the degree of contrast or sharpness desired in the pearlescent pattern produced in synthetic resin sheeting by following the method of this invention the orientation of the suspended lamellae to form a patterned effect having integral sheen may be brought about at various intervals within a certain viscosity range. If a sharply defined pearl effect is desired, the lamellae are oriented just prior to gelation or setting up of the polymerizable liquid organic compound into a semi solid state. Pearlescent patterns of lesser gradations of contrast may be obtained by orienting the lamellae under milder reciprocating action or at lower viscosities or stopping the motion at a time much sooner than gelation occurs in the material. If these conditions are carried to the extreme, the lamellae fade into complete disorientation and there is no line of disorientation along the edge and there is no propagation of the pattern into the sheet.

The elevated temperatures used for effecting the polymerization are those heretofore used in the art in preparing castings from these polymerizable liquid organic compounds. The optimum temperature for polymerization will vary appreciably depending upon the particular polymerizable compound, specific catalysts and portion thereof, time cycle permissible, and the like. Nevertheless, the temperature used will in most instances be between 20° C. and 250° C.

Various dyestuffs, plasticizers, lubricants, and other modifiers may be incorporated with the polymerizable liquid organic compounds to obtain certain desired characteristics in the finished product, according to well-known practices in the art.

The examples have illustrated the invention with respect to the making of sheets having integral sheen as such sheets are in great demand and the invention is particularly well adapted for making sheets. Nevertheless, the invention may be carried out in molds of all shapes to produce a wide variety of castings.

The advantages of this invention will be apparent to those skilled in the art. An improved, efficient, simple process is provided for preparing synthetic resin sheets with integral sheen containing any of a number of pattern decorative effects.

It is to be understood that this invention is not limited to the specific examples which have been offered merely as illustrations and that modifications may be made without departing from the spirit of the invention.

What is claimed is:

1. Process of preparing cast synthetic resin having integral sheen which comprises introducing a mixture of a liquid organic compound adapted to give a polymer solid at ordinary temperatures and a pigment into a mold having at least one patterned inner surface, subjecting the mold containing the liquid organic compound and pigment to a reciprocating motion, while the mold is subjected to polymerization conditions to induce polymerization of the organic compound to a polymer solid whereby pigment crystals are so oriented as to impart the integral sheen and withdrawing the polymer solid from the mold.

2. The process of claim 1 in which the reciprocating motion is confined to a substantially fixed plane.

3. The process of claim 1 in which the resin being prepared is a thermoplastic resin.

4. The process of claim 3 in which the resin being prepared is a methyl methacrylate resin.

5. The process of claim 1 including the additional step of machining smooth at least a portion of the patterned surface of the withdrawn polymer solid.

References Cited in the file of this patent

UNITED STATES PATENTS

| Number | Name | Date |
|---|---|---|
| 1,682,359 | Straub | Aug. 28, 1928 |
| 1,873,951 | Zocher | Aug. 30, 1932 |
| 2,084,399 | Kuettel | June 22, 1937 |
| 2,154,639 | Rohm et al. | Apr. 18, 1939 |
| 2,289,713 | Land | July 14, 1942 |
| 2,353,504 | Schachar | July 11, 1944 |
| 2,372,177 | Conner | Mar. 27, 1945 |
| 2,545,029 | Hemb | Mar. 13, 1951 |